United States Patent
Lee

(10) Patent No.: US 7,663,809 B2
(45) Date of Patent: Feb. 16, 2010

(54) COMPACT ZOOM LENS

(75) Inventor: Hwan-seon Lee, Changwon (KR)

(73) Assignee: Samsung Digital Imaging Co., Ltd., Suwon-si (KR)

( * ) Notice: Subject to any disclaimer, the term of this patent is extended or adjusted under 35 U.S.C. 154(b) by 0 days.

(21) Appl. No.: 12/316,738

(22) Filed: Dec. 16, 2008

(65) Prior Publication Data
US 2009/0195887 A1    Aug. 6, 2009

(30) Foreign Application Priority Data
Feb. 4, 2008    (KR) .................. 10-2008-0011062

(51) Int. Cl.
*G02B 15/14* (2006.01)
(52) U.S. Cl. ........................... 359/689
(58) Field of Classification Search .............. 359/689
See application file for complete search history.

(56) References Cited

U.S. PATENT DOCUMENTS

2006/0245075 A1*  11/2006  Lee .................... 359/680

FOREIGN PATENT DOCUMENTS

| JP | 2003-140047 A | 5/2003 |
|---|---|---|
| JP | 2004-333767 A | 11/2004 |
| JP | 2005-070696 A | 3/2005 |
| JP | 2005-140916 A | 6/2005 |
| JP | 2006-018199 A | 1/2006 |
| JP | 2006-078581 A | 3/2006 |
| JP | 2006-178242 A | 7/2006 |
| JP | 2006-194975 A | 7/2006 |
| JP | 2006-227516 A | 8/2006 |

* cited by examiner

*Primary Examiner*—William C Choi
(74) *Attorney, Agent, or Firm*—Drinker Biddle & Reath LLP

(57) ABSTRACT

A compact zoom lens including in an order from an object side to an image side, a first lens group having a negative refractive power, a second lens group having a positive refractive power, and a third lens group having a positive refractive power, wherein the first lens group includes two lens, the second lens group includes three lens, and the third lens group includes a single lens, wherein, during zooming from wide angle to telephoto, the distance between the first and second lens groups decreases, the distance between the second and third lens groups increases, and the third lens group moves toward the image side, and wherein the following mathematical inequalities are satisfied:

$$0.85 < \frac{LII}{\sqrt{f\omega \times ft}} < 1.0$$

$$0.3 < \frac{tII}{\sqrt{f\omega \times ft}} < 0.4,$$

where LII indicates the distance the second lens group moves during zooming from a wide-angle position to a telephoto position, tII indicates the thickness of the second lens group from a vertex of the utmost object side of the second lens group to a vertex of the image side of the second lens group, on the optical axis, fw indicates the overall focal distance at the wide-angle position, and ft indicates the overall focal distance at the telephoto position.

12 Claims, 8 Drawing Sheets

COMPACT ZOOM LENS

CROSS-REFERENCE TO RELATED PATENT APPLICATION

This application claims the benefit of Korean Patent Application No. 10-2008-0011062, filed on Feb. 4, 2008, in the Korean Intellectual Property Office, the disclosure of which is incorporated herein in its entirety by reference.

BACKGROUND OF THE INVENTION

1. Field of the Invention

The present invention relates to a compact and inexpensive zoom lens.

2. Description of the Related Art

Digital still cameras or video cameras having a solid-state imaging device such as a charge coupled device (CCD) or a complementary metal-oxide semiconductor (CMOS) are widely used nowadays. In this regard, the demand for mega-pixel camera modules is increasing. Inexpensive digital cameras have a resolution of five megapixels or greater and provide high-definition performance. Reduction of size, weight, and cost is desired in optical imaging devices including mobile phone cameras or digital cameras using an imaging device such as a CCD or a CMOS.

In order to satisfy demands for size reduction, a retractable lens barrel in which a lens is extended to a certain position in a photographing mode and the lens is retracted into a camera body in a non-photographing mode is widely used. A camera having such a retractable lens barrel may have a small thickness and improved portability only if the distance between lens groups is minimized when the lens barrel is retracted into the camera body. In order to make the retractable lens barrel small and thin, the number of lens groups should be reduced. At the same time, high optical performance has to be provided for a large number of pixels.

In order to satisfy the above-described demand, a zoom lens including three lens groups is widely used. An example of a zoom lens system having a variable magnification of two times or higher and including a compact photographing lens system, is a well-known zoom lens system which includes, in order from object side to image side, a first lens group having a negative refractive power, a second lens group having an overall positive refractive power, and a third lens group having a positive refractive power and varies magnification by varying a distance between lens groups.

Another example is a zoom lens including two lens groups such as a first lens group having a negative refractive power and a second lens group having a positive refractive power. The focal length of the zoom lens system including the two lens groups is determined by multiplying a magnification of the first lens group by the magnification of the second lens group. During zooming from wide to telephoto the distance between the first and second lens groups varies and thus the focal length also varies. Since the magnification power of the back lens group is relatively small, an aberration variation in accordance with a varied magnification is small but the aperture of the front lens group is relatively large and the length of the retro-focus type system is relatively long. Thus, reduction of an optical full length is restrictive and magnification is restricted to approximately two times. However, despite the high magnification achieved, reduction of size and cost may not be easily achieved concurrently.

SUMMARY OF THE INVENTION

The present invention provides a compact and inexpensive zoom lens having an improved variable magnification characteristic.

According to an aspect of the present invention, there is provided a compact zoom lens including, from object side to image side, a first lens group having a negative refractive power, a second lens group having a positive refractive power, and a third lens group having a positive refractive power, wherein the first lens group includes two lens, the second lens group includes three lens, and the third lens group includes a single lens, wherein, during zooming from wide to telephoto, the distance between the first and second lens groups decreases, the distance between the second and third lens groups increases, and the third lens group moves toward the image side, and wherein the following mathematical inequalities are satisfied:

$$0.85 < \frac{LII}{\sqrt{fw \times ft}} < 1.0$$

$$0.3 < \frac{tII}{\sqrt{fw \times ft}} < 0.4,$$

where LII indicates the distance the second lens group moves during zooming from the wide-angle position to the telephoto position, tII indicates the thickness of the second lens group from a vertex of the utmost object side of the second lens group to a vertex of the image side of the second lens group, on the optical axis, fw indicates the overall focal distance at the wide-angle position, and ft indicates the overall focal distance at the telephoto position.

The compact zoom lens may satisfy the following mathematical inequality:

$$1.5 < \frac{fIII}{\sqrt{fw \times ft}} < 2.0,$$

where, fIII indicates the overall focal distance of the third lens group, fw indicates the overall focal distance at the wide-angle position, and ft indicates the overall focal distance at the telephoto position.

The first lens group may include a positive lens and a negative lens having a meniscus shape which is convex toward the object side.

The second lens group may include a positive lens which is convex toward the object side, and a cemented lens which is formed of positive and negative lens, which are sequentially disposed in an order from an object side of the second lens group.

BRIEF DESCRIPTION OF THE DRAWINGS

The above and other features and advantages of the present invention will become more apparent from the following detailed description of exemplary embodiments with reference to the attached drawings in which.

DETAILED DESCRIPTION OF THE INVENTION

Hereinafter, the present invention will be described in detail by explaining embodiments of the invention with reference to the attached drawings.

Figure 1:
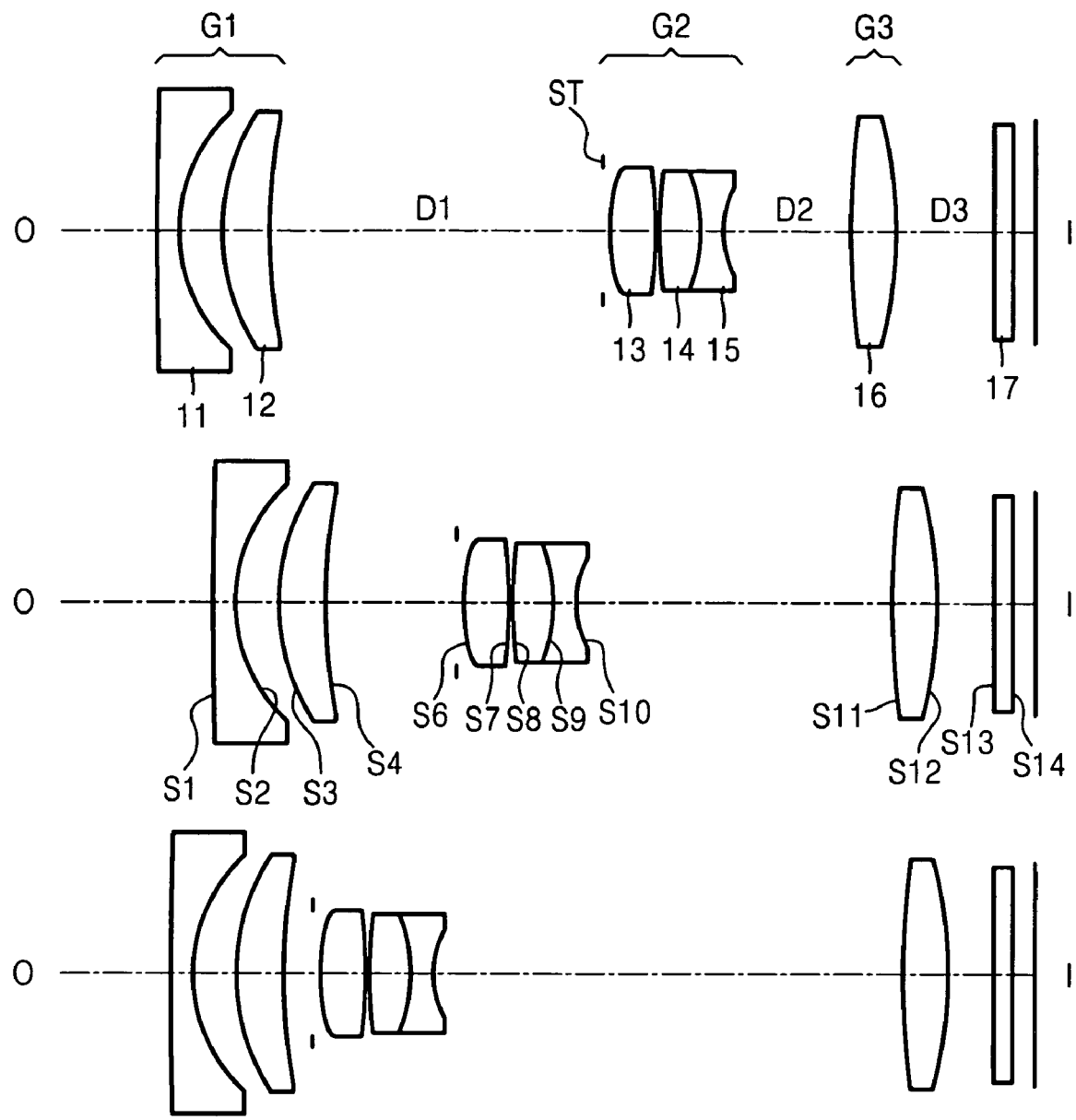
FIG. 1 is a diagram illustrating a wide-angle position, an intermediate position, and a telephoto position of a zoom lens according to a first embodiment of the present invention.

Referring to FIG. 1, the zoom lens according to the current embodiment of the present invention includes a first lens group G1 having a negative refractive power, a second lens group G2 having a positive refractive power, and a third lens group G3 having a positive refractive power. During zooming from wide to telephoto, the distance D1 between the first and second lens groups G1 and G2 decreases, the distance D2 between the second and third lens groups G2 and G3 increases, and the third lens group G3 moves toward the image side. For example, during zooming from the wide-angle position to the telephoto position, the second lens group G2 varies the magnification, and the first and third lens groups G1 and G3 move in association with the second lens group G2 and compensate for the focal position that moves during zooming. According to an embodiment of the present invention, all three lens groups G1 through G3 move during zooming.

Referring to FIG. 1, the first lens group G1 includes two lens such as a first lens 11 having a negative refractive power and a second lens 12 having a positive refractive power. The first lens 11 includes at least one aspherical surface so as to realize size reduction and compensate for coma aberration and astigmatism which occur due to light that is incident out of axis. By using a lens having a high refractive index as the first lens 11, a compact size and an excellent optical performance may be achieved.

The second lens group G2 includes a third lens 13, a fourth lens 14, and a fifth lens 15. An aperture stop ST may be disposed at the object side or the image side of the second lens group G2, and thus the stop ST may operate in conjunction with the second lens group G2 during zooming. A positive lens which is convex toward the object side and has at least one aspherical surface is used as the third lens 13. The fourth lens 14 having a positive refractive power and the fifth lens 15 having a negative refractive power are bonded together into a cemented lens group having a negative refractive power so as to reduce eccentric sensitivity. The second lens group G2 compensates for spherical aberration and aberration of a high order by including at least one aspherical surface, and achieves a compact size by minimizing the number of lenses.

The third lens group G3 includes a lens such as a sixth lens 16, and compensates for the focal position that moves during zooming. The sixth lens 16 has a positive refractive power and satisfies a telecentric characteristic. The zoom lens according to the current embodiment of the present invention has a variable magnification of approximately three times, includes a wide-angle position having a viewing angle of 60~70°, and achieves a compact size.

Meanwhile, the zoom lens according to the current embodiment of the present invention may satisfy Mathematical Inequalities 1 and 2 below:

$$0.85 < \frac{LII}{\sqrt{fw \times ft}} < 1.0 \quad (1)$$

$$0.3 < \frac{tII}{\sqrt{fw \times ft}} < 0.4, \quad (2)$$

where LII indicates the distance the second lens group G2 moves during zooming from the wide-angle position to the telephoto position, tII indicates the thickness of the second lens group G2 from a vertex of the utmost object side of the second lens group G2 to a vertex of the utmost image side of the second lens group G2 on the optical axis, fw indicates the overall focal distance at the wide-angle position, and ft indicates the overall focal distance at the telephoto position. Mathematical Inequality 1 defines a ratio between the movement amount (zoom stroke) of the second lens group G2 during the magnification variation and a combined focal distance of the focal distances at the wide-angle position and the telephoto position. Mathematical Inequality 1 is used in order to reduce the thickness of the lens barrel when the lens barrel is retracted into the camera body, by minimizing the zoom stroke of the second lens group G2 during the magnification variation.

Mathematical Inequality 2 defines the ratio between the thickness of the second lens group G2 from a vertex at the utmost object side of the second lens group G2 to a vertex at the utmost image side of the second lens group G2, on the optical axis, and the combined focal distance of the focal distances of the wide-angle position and the telephoto position. By using a small number of lenses, a compact size and an excellent optical performance may be achieved. The compact size may not be easily achieved if the ratio defined by Mathematical Inequality 2 is greater than the upper limit. Also, if the ratio defined by Mathematical Inequality 2 is less than the lower limit the refractive power of the second lens group G2 becomes weak and the zoom stroke, and thus the compact size may not be easily achieved.

The second lens group G2 may satisfy Mathematical Inequality 3:

$$1.5 < \frac{fIII}{\sqrt{fw \times ft}} < 2.0, \quad (3)$$

where, fIII indicates the overall focal distance of the third lens group G3, fw indicates the overall focal distance at the wide-angle position, and ft indicates the overall focal distance at the telephoto position. Mathematical Formula 3 defines the ratio between the focal distance of the third lens group G3 and a combined focal distance of the focal distances at the wide-angle position and the telephoto position. Mathematical Formula 3 is used in order to achieve an excellent optical performance during the magnification variation from the wide-angle position to the telephoto position, and to minimize variation in performance in accordance with an imaging distance. If the ratio defined by Mathematical Inequality 3 is greater than the upper limit, the F number of the telephoto position increases and the distance from the image plane to the third lens group G3 also increases, and thus the compact size may not be easily achieved. If the ratio defined by Mathematical Inequality 3 is less than the lower limit, the space from the image plane to the third lens group G3 decreases, and thus a movement space of the third lens group G3 decreases with reference to an error of the image plane, which occurs when a lens is manufactured.

Meanwhile, in the present invention, each of the first and second lens groups G1 and G2 may include at least one aspherical surface or each of the first through third lens groups G1 through G3 may include at least one aspherical surface.

In the present invention, an aspherical surface is defined as described below.

Assuming that the direction of an optical axis is referred to as an X axis, a direction that is perpendicular to the optical axis is referred to as a Y axis, and a proceeding direction of light is referred to as a positive direction, an aspherical shape of the zoom lens according to the present invention may be represented by using Mathematical Equation 4. In Mathematical Equation 4, x indicates a distance from a vertex of a lens in the direction of the optical axis, y indicates a distance in the direction that is perpendicular to the optical axis, k indicates a conic constant, each of A, B, C, and D indicates an aspherical coefficient, and c indicates an inverse number of the radius of curvature.

$$x = \frac{cy^2}{1 + \sqrt{1 - (k+1)c y^2}} + Ay^4 + By^6 + Cy^8 + Dy^{10} \quad (4)$$

The present invention includes lenses satisfying optimal conditions for realizing a compact zoom lens, according to various embodiments of the present invention, which will now be described.

In the following description of the present invention, f indicates the combined focal distance of an overall lens system, Fno indicates the F number, $2w$ indicates the viewing angle, R indicates the radius of curvature, Dn indicates the centric thickness of the lens or the distance between lenses, nd indicates a refractive index, and vd indicates an Abbe number. Also, ST indicates an aperture stop, each of D1, D2, and D3 indicates a variable distance, and * indicates an aspherical surface. In the drawings, like reference numerals denote like lens included in each lens group.

FIRST EMBODIMENT

FIG. 1 is a diagram illustrating a wide-angle position, an intermediate position, and a telephoto position of a zoom lens according to a first embodiment of the present invention.

f; 7.73~14.42~22.25  Fno; 2.79~4.00~5.26  $2\omega$; 64.41~35.97~23.69

Table 1 shows the R, Dn, nd and vd of each of a plurality of lens surfaces S1 through S4, ST, and S6 through S14 of the first, second and third lens groups G1 to G3, respectively, of the zoom lens according to the first embodiment of the present invention.

TABLE 1

| Lens Surface | R | Dn | nd | vd |
|---|---|---|---|---|
| S1* | 250 | 1 | 1.8047 | 40.9 |
| S2* | 6.956 | 1.88 | | |
| S3 | 10.872 | 1.96 | 1.84666 | 23.8 |
| S4 | 30.711 | D1 | | |
| ST | infinity | 0.3 | | |
| S6* | 6.365 | 2.04 | 1.58332 | 59.1 |
| S7* | −25.596 | 0.15 | | |
| S8 | 16.784 | 1.75 | 1.883 | 40.8 |
| S9 | −6.434 | 0.91 | 1.68893 | 31.2 |
| S10 | 4.273 | D2 | | |
| S11 | 26.416 | 2.05 | 1.57965 | 61.6 |
| S12 | −22.234 | D3 | | |
| S13 | infinity | 0.8 | 1.5168 | 64.2 |
| S14 | infinity | | | |

Table 2 shows the conic constant k and aspherical coefficients A, B, C and D of each of the lens surfaces S1, S2, S6 and S7.

TABLE 2

| Lens Surface | k | A | B | C | D |
|---|---|---|---|---|---|
| S1 | −150 | −5.15E−05 | 5.05E−06 | −9.65E−08 | 6.88E−10 |
| S2 | −1 | 8.34E−05 | 9.68E−06 | −1.61E−07 | 1.42E−09 |
| S6 | −1 | −1.40E−04 | −3.17E−06 | 3.24E−07 | −1.37E−08 |
| S7 | −14.7733 | 2.89E−04 | 6.05E−06 | 6.30E−08 | 0.00E+00 |

Table 3 shows variable distances D1, D2, and D3 in the zoom lens according to the first embodiment of the present invention, with respect to the wide-angle position, the intermediate position, and the telephoto position.

TABLE 3

| Variable Distance | Wide-Angle Position | Intermediate Position | Telephoto position |
|---|---|---|---|
| D1 | 14.41 | 5.49 | 1.09 |
| D2 | 5.53 | 13.57 | 20.41 |
| D3 | 4.22 | 2.46 | 1.9 |

Figure 2:
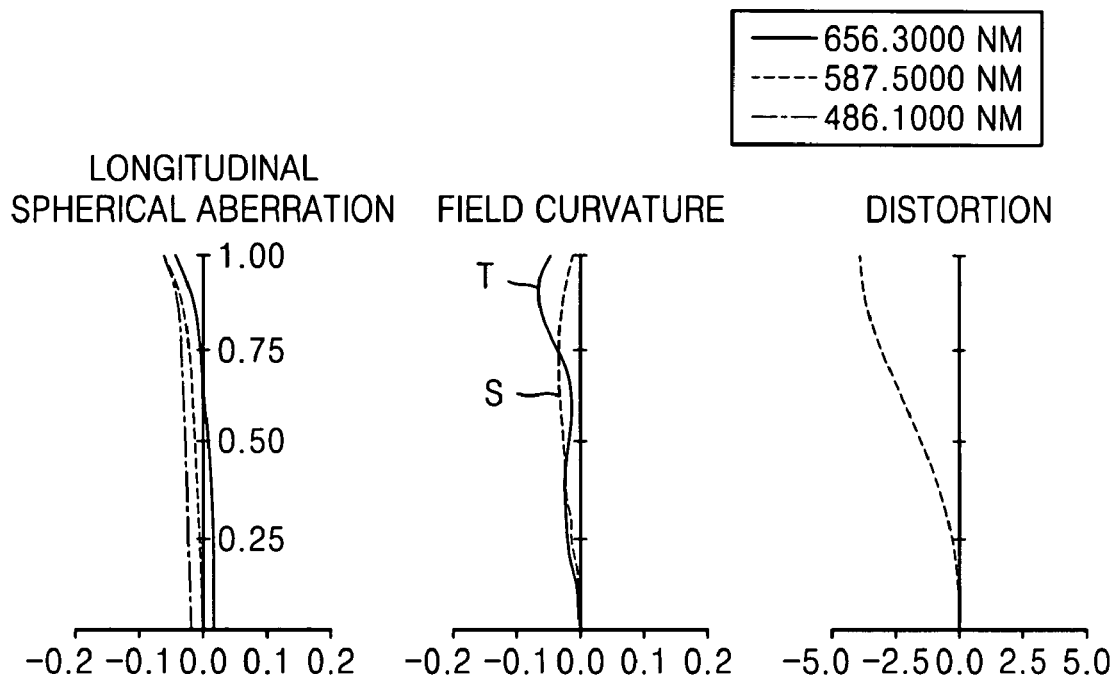
FIGS. 2 and 3 are graphs showing aberration characteristics of the wide-angle position and the telephoto position of the zoom lens according to the first embodiment of the present invention.
Figure 3:
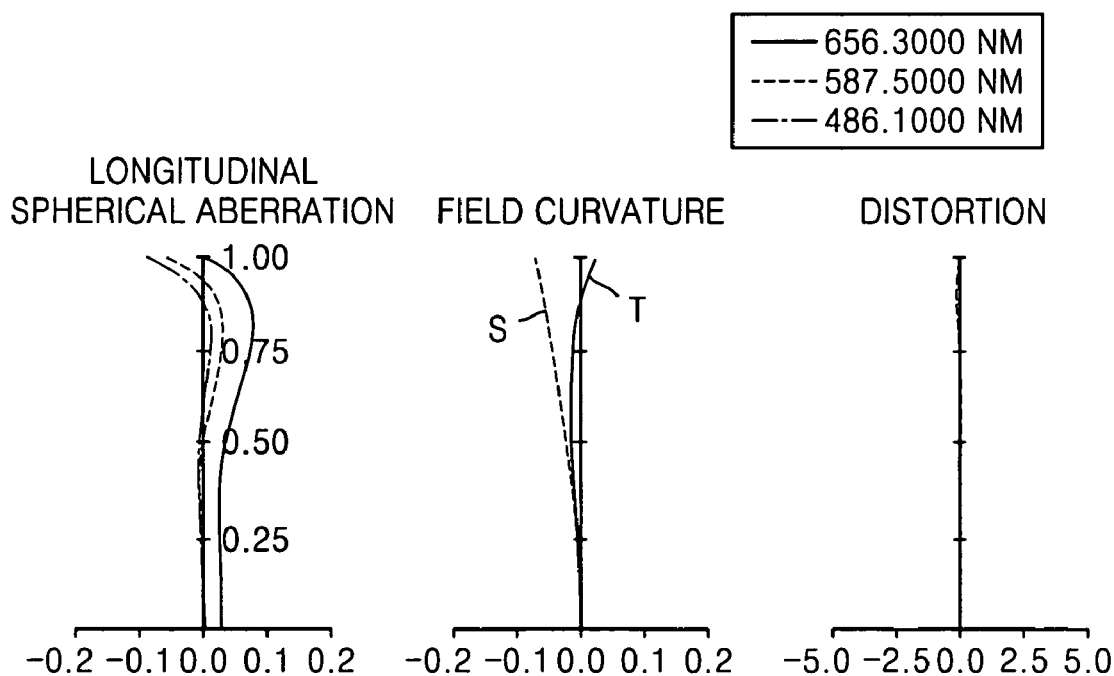

FIGS. 2 and 3 are graphs showing spherical aberration, field curvature, and distortion of the wide-angle position and the telephoto position of the zoom lens according to the first embodiment of the present invention. Referring to FIGS. 2 and 3, tangential field curvature T and sagittal field curvature S constitute the field curvature.

SECOND EMBODIMENT

Figure 4:
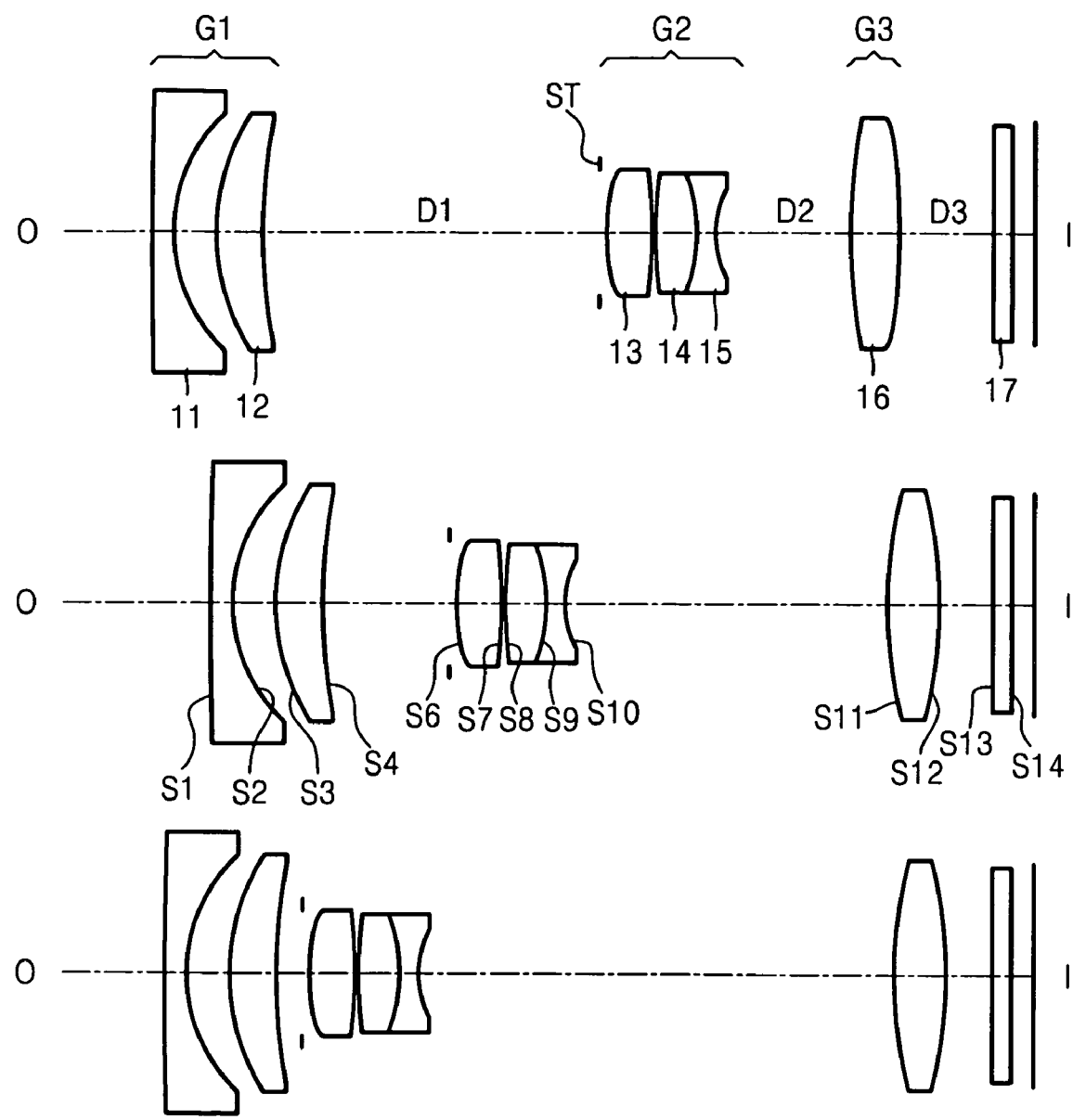
FIG. 4 is a diagram illustrating a wide-angle position, an intermediate position, and a telephoto position of a zoom lens according to a second embodiment of the present invention.

FIG. 4 is a diagram illustrating a wide-angle position, an intermediate position, and a telephoto position of a zoom lens according to a second embodiment of the present invention.

f; 7.73~14.52~22.25  Fno; 2.82~4.06~5.29  $2\omega$; 64.41~35.75~23.70

Table 4 shows the R, Dn, nd and vd of each of the lens surfaces S1 through S4, ST, and S6 through S14 of the first, second and third lens groups G1 to G3, respectively, of the zoom lens according to the second embodiment of the present invention.

TABLE 4

| Lens Surface | R | Dn | nd | vd |
|---|---|---|---|---|
| S1* | 140.333 | 1 | 1.8047 | 41 |
| S2* | 6.79 | 1.93 | | |
| S3 | 10.808 | 1.95 | 1.84666 | 23.8 |
| S4 | 29.593 | D1 | | |
| ST | infinity | 0.3 | | |
| S6* | 6.209 | 2 | 1.58332 | 59.1 |
| S7* | −29.153 | 0.15 | | |
| S8 | 15.024 | 1.77 | 1.883 | 40.8 |
| S9 | −6.658 | 0.7 | 1.68893 | 31.2 |
| S10 | 4.177 | D2 | | |
| S11 | 21.804 | 2.25 | 1.5168 | 64.2 |
| 12 | −21.804 | D3 | | |
| S13 | infinity | 0.8 | 1.5168 | 64.2 |
| S14 | infinity | | | |

Table 5 shows the conic constant k and aspherical coefficients A, B, C and D of each of the lens surfaces S1, S2, S6 and S7.

TABLE 5

| Lens Surface | k | A | B | C | D |
|---|---|---|---|---|---|
| S1 | 110.3671 | −5.72E−05 | 3.94E−06 | −7.32E−08 | 5.28E−10 |
| S2 | −1 | 9.87E−05 | 7.64E−06 | −1.29E−07 | 1.36E−09 |
| S6 | −1 | −1.09E−04 | −2.73E−06 | −4.05E−08 | 0.00E+00 |
| S7 | −19.2463 | 2.88E−04 | 3.43E−06 | 0.00E+00 | 0.00E+00 |

Table 6 shows variable distances D1, D2, and D3 in the zoom lens according to the second embodiment of the present invention, with respect to the wide-angle position, the intermediate position, and the telephoto position.

TABLE 6

| Variable Distance | Wide-Angle Position | Intermediate Position | Telephoto position |
|---|---|---|---|
| D1 | 14.58 | 5.55 | 14.58 |
| D2 | 5.87 | 14.05 | 5.87 |
| D3 | 4.07 | 2.28 | 4.07 |

Figure 5:
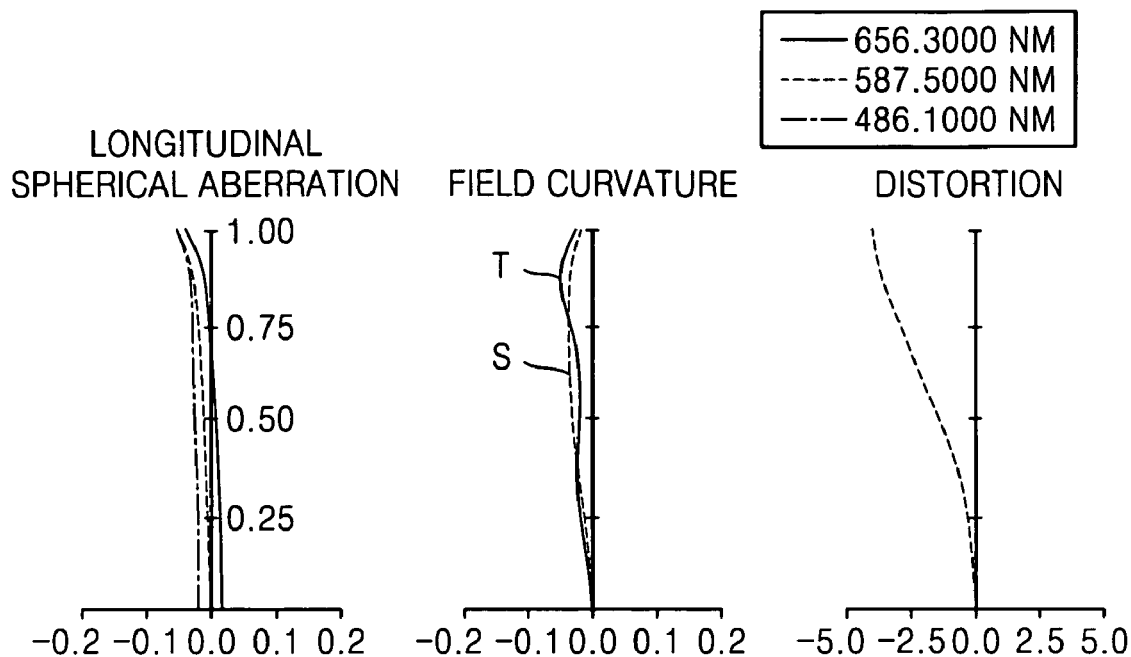
FIGS. 5 and 6 are graphs showing aberration characteristics of the wide-angle position and the telephoto position of the zoom lens according to the second embodiment of the present invention.
Figure 6:
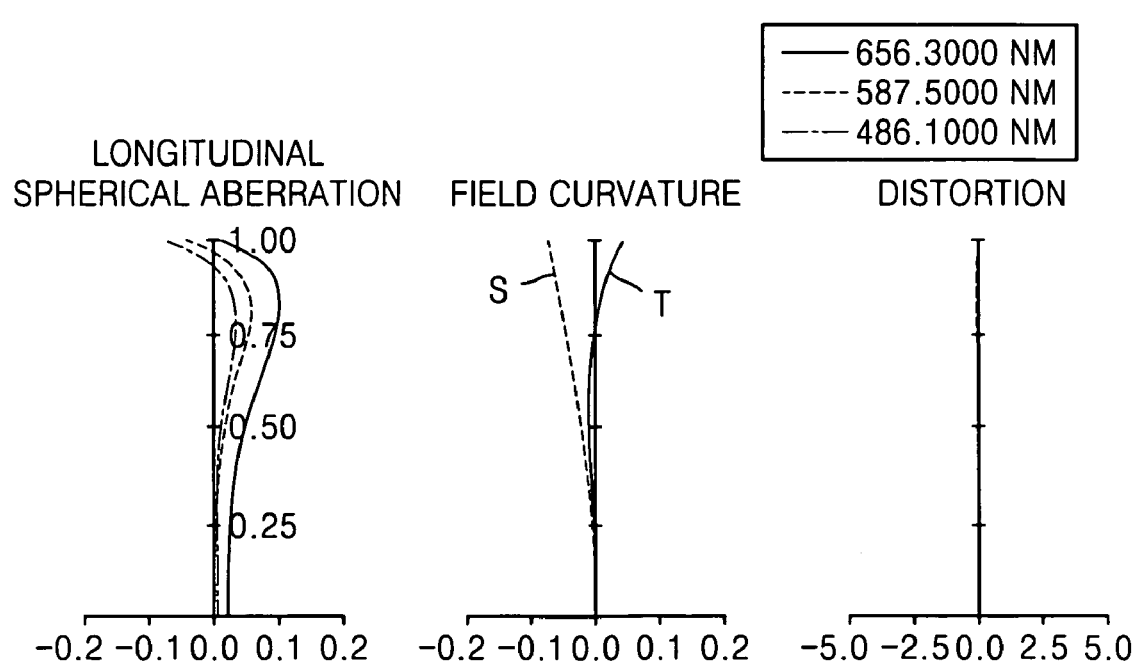

FIGS. 5 and 6 are graphs showing spherical aberration, field curvature, and distortion of the wide-angle position and the telephoto position of the zoom lens according to the second embodiment of the present invention.

THIRD EMBODIMENT

Figure 7:
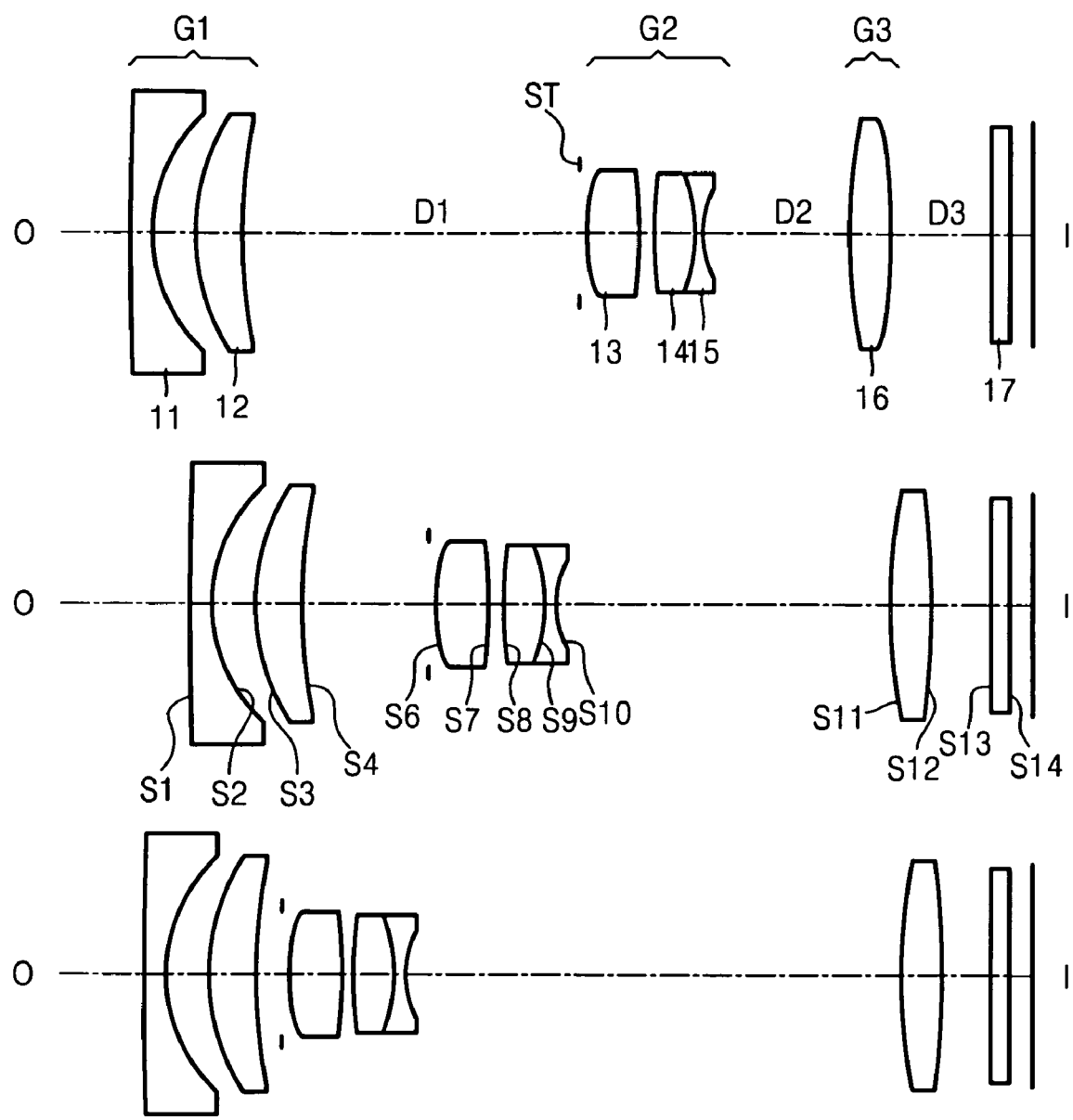
FIG. 7 is a diagram illustrating a wide-angle position, an intermediate position, and a telephoto position of a zoom lens according to a third embodiment of the present invention.

FIG. 7 is a diagram illustrating a wide-angle position, an intermediate position, and a telephoto position of a zoom lens according to a third embodiment of the present invention.

f; 7.71~14.41~22.20  Fno; 2.84~4.03~5.27  2ω; 64.56~35.85~23.58

Table 7 shows the R, Dn, nd and vd of each of the lens surfaces S1 to S4, ST, and S6 to S14 of the first, second and third lens groups G1 to G3, respectively, of the zoom lens according to the third embodiment of the present invention.

TABLE 7

| Lens Surface | R | Dn | nd | vd |
|---|---|---|---|---|
| S1* | 147.423 | 1 | 1.8047 | 40.9 |
| S2* | 6.739 | 1.85 | | |
| S3 | 10.59 | 1.98 | 1.84666 | 23.8 |
| S4 | 28.703 | D1 | | |
| ST | infinity | 0.34 | | |
| S6* | 8.098 | 2.23 | 1.58332 | 59.1 |

TABLE 7-continued

| Lens Surface | R | Dn | nd | vd |
|---|---|---|---|---|
| S7 | −20.059 | 0.63 | | |
| S8 | 13.715 | 1.83 | 1.883 | 40.8 |
| S9 | −5.961 | 0.45 | 1.68893 | 31.2 |
| S10 | 4.556 | D2 | | |
| S11 | 30.569 | 1.78 | 1.694 | 53.2 |
| S12* | −31.572 | D3 | | |
| S13 | infinity | 0.8 | 1.5168 | 64.2 |
| S14 | infinity | | | |

Table 8 shows the conic constant k and aspherical coefficients A, B, C and D of each of the lens surfaces S1, S2, S6 and S12.

TABLE 8

| Lens Surface | k | A | B | C | D |
|---|---|---|---|---|---|
| S1 | 140.8612 | −3.26E−05 | 2.70E−06 | −4.97E−08 | 3.22E−10 |
| S2 | −1 | 1.45E−04 | 4.90E−06 | −3.68E−08 | −1.46E−10 |
| S6 | −1 | −5.12E−04 | −8.53E−06 | −3.48E−07 | 0.00E+00 |
| S12 | −8.4861 | 0.00E+00 | −5.41E−07 | 0.00E+00 | 0.00E+00 |

Table 9 shows variable distances D1, D2, and D3 in the zoom lens according to the third embodiment of the present invention, with respect to the wide-angle position, the intermediate position, and the telephoto position.

TABLE 9

| Variable Distance | Wide-Angle Position | Intermediate Position | Telephoto position |
|---|---|---|---|
| D1 | 14.62 | 5.5 | 1.09 |
| D2 | 6.2 | 14.44 | 21.49 |
| D3 | 4.44 | 2.63 | 2 |

Figure 8:
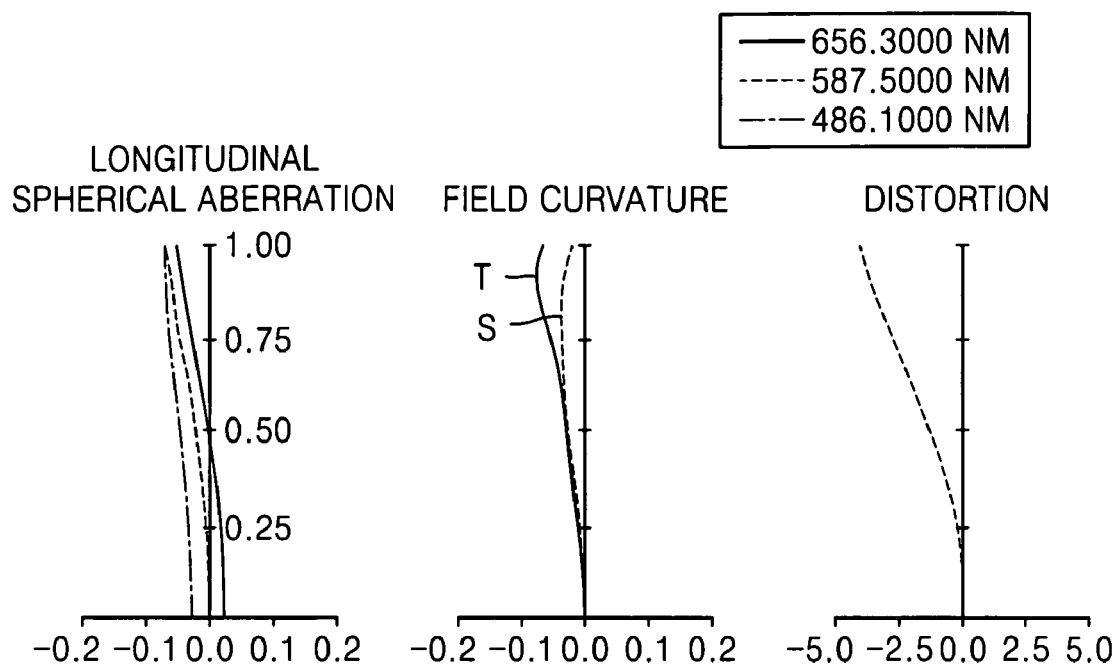
FIGS. 8 and 9 are graphs showing aberration characteristics of the wide-angle position and the telephoto position of the zoom lens according to the third embodiment of the present invention.
Figure 9:
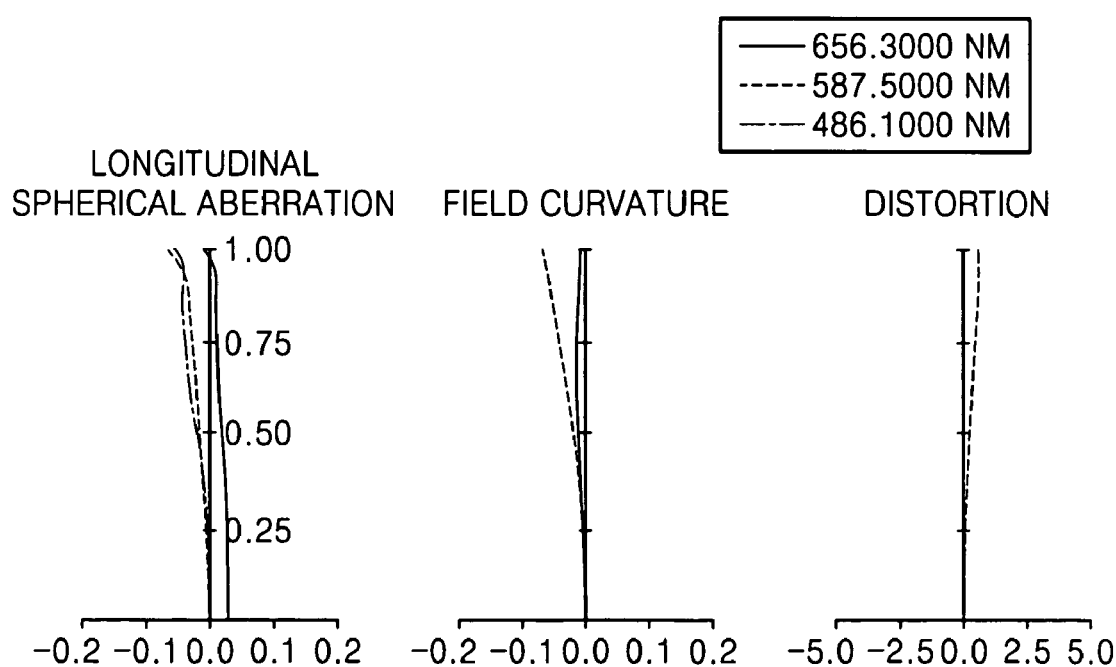

FIGS. 8 and 9 are graphs showing spherical aberration, field curvature, and distortion of the wide-angle position and the telephoto position of the zoom lens according to the third embodiment of the present invention.

FOURTH EMBODIMENT

Figure 10:
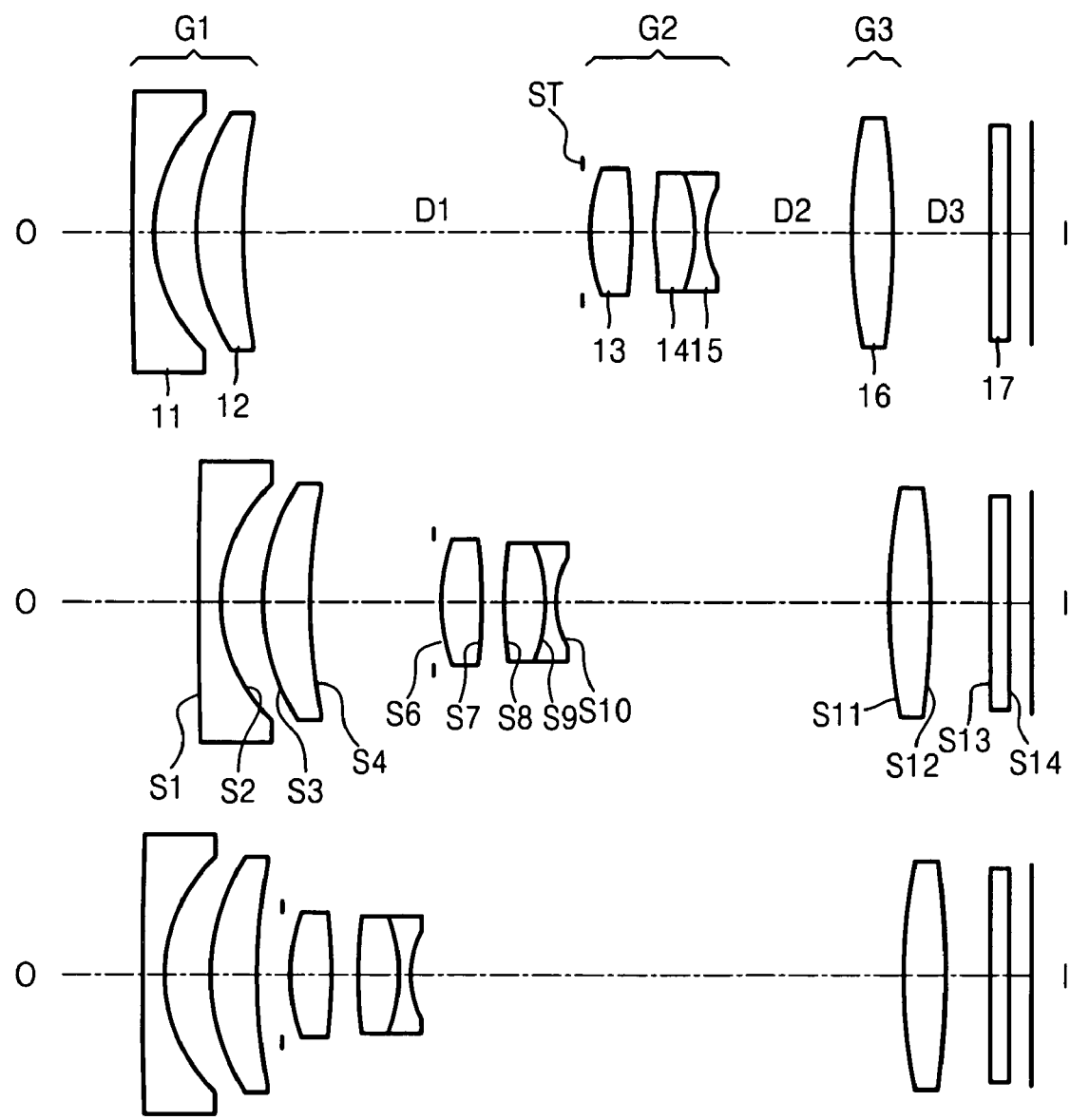
FIG. 10 is a diagram illustrating a wide-angle position, an intermediate position, and a telephoto position of a zoom lens according to a fourth embodiment of the present invention.

FIG. 10 is a diagram illustrating a wide-angle position, an intermediate position, and a telephoto position of a zoom lens according to a fourth embodiment of the present invention.

f; 7.73~14.45~22.25 Fno ; 2.84~4.00~5.27 2ω; 64.39~35.80~23.56

Table 10 shows the R, Dn, nd and vd of each of the lens surfaces S1 to S4, ST, and S6 to S14 of the first, second and third lens groups G1 to G3, respectively, of the zoom lens according to the fourth embodiment of the present invention.

TABLE 10

| Lens Surface | R | Dn | nd | vd |
|---|---|---|---|---|
| S1* | 86.868 | 1.04 | 1.80471 | 40.9 |
| S2* | 6.609 | 1.97 | | |
| S3 | 10.602 | 1.95 | 1.84667 | 23.8 |
| S4 | 27.026 | D1 | | |
| ST | infinity | 0.4 | | |
| S6* | 8.037 | 1.68 | 1.589 | 61.3 |
| S7 | −20.831 | 1.05 | | |
| S8 | 13.873 | 1.82 | 1.88301 | 40.8 |
| S9 | −6.076 | 0.45 | 1.68823 | 31.2 |
| S10 | 4.506 | D2 | | |
| S11 | 26.442 | 1.84 | 1.694 | 53.2 |
| S12* | −34.87 | D3 | | |
| S13 | infinity | 0.8 | 1.5168 | 64.2 |
| 1S4 | infinity | | | |

Table 11 shows the conic constant k and aspherical coefficients A, B, C and D of each of the lens surfaces S1, S2, S6 and S12.

TABLE 11

| Lens Surface | k | A | B | C | D |
|---|---|---|---|---|---|
| S1 | 71.2111 | −1.19E−04 | 5.28E−06 | −9.23E−08 | 5.68E−10 |
| S2 | −1 | 6.73E−05 | 7.35E−06 | −2.72E−08 | −1.06E−09 |
| S6 | −1 | −4.80E−04 | −5.42E−06 | −3.97E−07 | 0.00E+00 |
| S12 | −11.2264 | 0.00E+00 | −1.96E−06 | 3.04E−08 | 0.00E+00 |

Table 12 shows variable distances D1, D2, and D3 in the zoom lens according to the fourth embodiment of the present invention, with respect to the wide-angle position, the intermediate position, and the telephoto position.

TABLE 12

| Variable Distance | Wide-Angle Position | Intermediate Position | Telephoto position |
|---|---|---|---|
| D1 | 14.63 | 5.33 | 1.16 |
| D2 | 6.3 | 14.19 | 21.47 |
| D3 | 4.18 | 2.75 | 1.93 |

Figure 11:
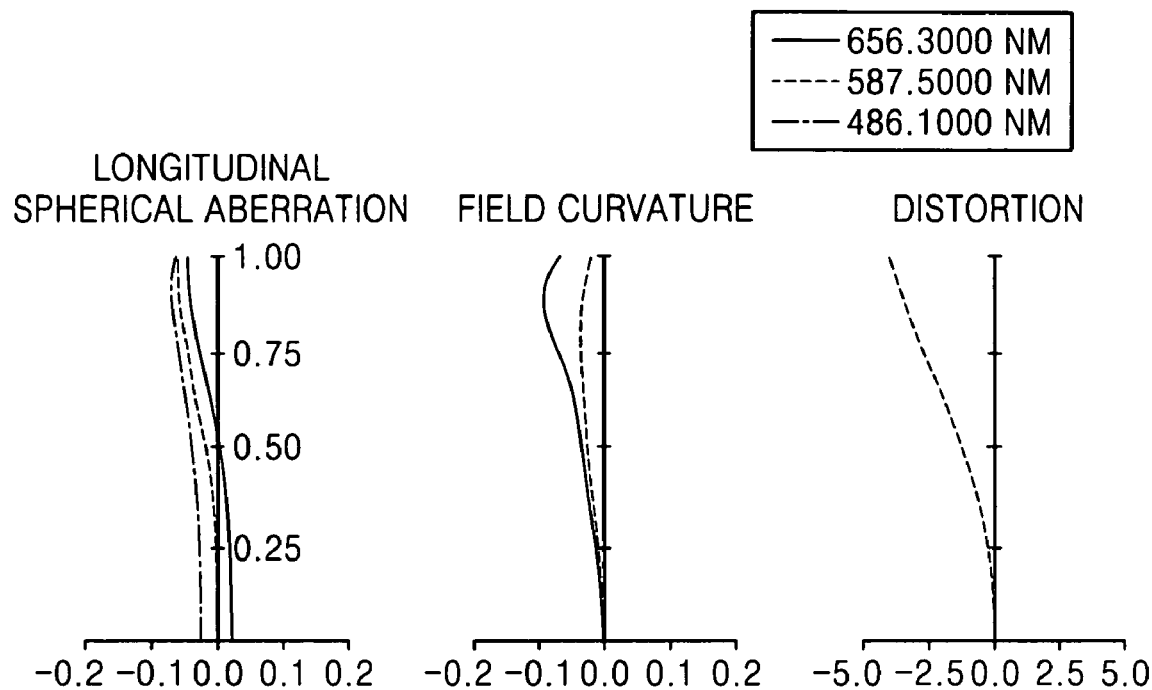
FIGS. 11 and 12 are graphs showing aberration characteristics of the wide-angle position and the telephoto position of the zoom lens according to the fourth embodiment of the present invention.
Figure 12:
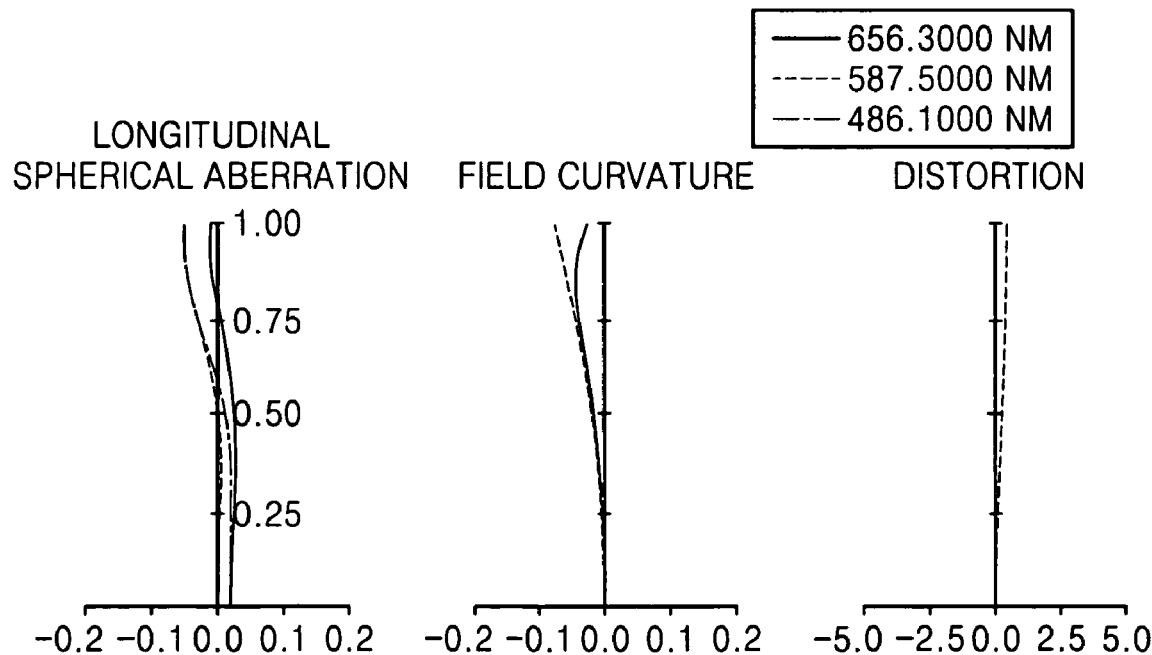

FIGS. 11 and 12 are graphs showing spherical aberration, field curvature, and distortion of the wide-angle position and the telephoto position of the zoom lens according to the fourth embodiment of the present invention.

Table 13 shows that the first through fourth embodiments of the present invention satisfy Mathematical Formulas 1 through 3.

TABLE 13

| | Embodiment 1 | Embodiment 2 | Embodiment 3 | Embodiment 4 |
|---|---|---|---|---|
| Mathematical Inequality 1 | 0.96 | 0.97 | 0.98 | 0.99 |
| Mathematical Inequality 2 | 0.37 | 0.35 | 0.39 | 0.38 |
| Mathematical Inequality 3 | 1.61 | 1.63 | 1.72 | 1.67 |

As described above, the present invention provides a high-definition zoom lens which has a variable magnification of three times or greater, has a compact size, and is suitable for portable terminals and digital still or video cameras, using a solid-state imaging device such as a charge coupled device (CCD) or a complementary metal-oxide semiconductor (CMOS).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A compact zoom lens comprising in an order from an object side to an image side, a first lens group having a negative refractive power, a second lens group having a positive refractive power, and a third lens group having a positive refractive power, wherein the first lens group comprises two lenses, the second lens group comprises three lenses, and the third lens group comprises a single lens, wherein, during zooming from wide angle to telephoto, the distance between the first and second lens groups decreases, the distance between the second and third lens groups increases, and the third lens group moves toward the image side, and wherein the following mathematical inequalities are satisfied:

$$0.85 < \frac{LII}{\sqrt{fw \times ft}} < 1.0$$

$$0.3 < \frac{tII}{\sqrt{fw \times ft}} < 0.4,$$

$$1.5 < \frac{fIII}{\sqrt{fw \times ft}} < 2.0,$$

where LII indicates the distance the second lens group moves during zooming from a wide-angle position to a telephoto position, tII indicates the thickness of the second lens group from a vertex of the utmost object side of the second lens group to a vertex of the image side of the second lens group, on the optical axis, fIII indicates the overall focal distance of the third lens group, fw indicates the overall focal distance at the wide-angle position, and ft indicates the overall focal distance at the telephoto position.

2. The compact zoom lens of claim 1, wherein the first through third lens groups move during zooming from the wide-angle position to the telephoto position.

3. The compact zoom lens of claim 1, wherein the third lens group compensates for a focal position that moves in accordance with a varied photographing distance during zooming.

4. The compact zoom lens of claim 1, further comprising a stop disposed at an object side or an image side of the second lens group, so as to operate in conjunction with the second lens group during zooming.

5. The compact zoom lens of claim 1, wherein the first lens group comprises a positive lens and a negative lens having a meniscus shape which is convex toward the object side.

6. The compact zoom lens of claim 1, wherein the second lens group comprises a positive lens which is convex toward the object side, and a cemented lens which is formed of positive and negative lens, which are sequentially disposed in an order from an object side of the second lens group.

7. The compact zoom lens of claim 1, wherein the third lens group comprises a positive lens.

8. The compact zoom lens of claim 1, wherein each of the first and second lens groups comprises at least one aspherical surface.

9. The compact zoom lens of claim 1, wherein each of the first through third lens groups comprises at least one aspherical surface.

10. The compact zoom lens of claim 1, wherein the first through third lens groups move during zooming from the wide-angle position to the telephoto position.

11. The compact zoom lens of claim 1, wherein the third lens group compensates for a focal position that moves in accordance with a varied photographing distance during zooming.

12. The compact zoom lens of claim 1, further comprising a stop disposed at an object side or an image side of the second lens group, so as to operate in conjunction with the second lens group during zooming.

* * * * *